M. LAVEQUE.
NUT LOCK.
APPLICATION FILED AUG. 21, 1916.

1,223,405.

Patented Apr. 24, 1917.

Inventor
Mose Laveque,
By Geo. P. Kimmel
Attorney

UNITED STATES PATENT OFFICE.

MOSE LAVEQUE, OF MUNISING, MICHIGAN.

NUT-LOCK.

1,223,405.  Specification of Letters Patent.  Patented Apr. 24, 1917.

Application filed August 21, 1916. Serial No. 116,048.

*To all whom it may concern:*

Be it known that I, MOSE LAVEQUE, a citizen of the United States, and resident of Munising, in the county of Alger and State of Michigan, have invented certain new and useful Improvements in Nut-Locks, of which the following is a specification.

A nut of the usual shape is provided and designated 3, the same being formed with a threaded bore. The nut 3 is provided with a tangential recess 4 communicating with the bore in said nut. The nut is also formed with a vertical slot 5 communicating with the recess 4, said slot extending to the outer face of the nut for a purpose which will hereinafter appear.

A locking pawl 6 having thread engaging teeth 7 on one side adjacent the inner end thereof is movable in the recess 4, said pawl having a laterally extending shank 8 formed with an arm 9 on the free end thereof, said arm having a hook 10 formed therefrom.

The pawl member 6 is adapted to slide within the recess 4, the shank 8 seating in the slot 5.

The arm 9 and hook portion 10 project beyond the outer surface of the nut, said hook member to be engaged by the free end of a spring arm 11 having a shank portion 12 anchored at 13 to the body of the nut. The spring 11 normally tends to maintain the pawl member at the inner end of the recess 4, causing the teeth 7 to normally engage the threads of the bolt.

It will be seen that by removing the free end of the spring from the hook 10 the pawl may be completely removed from the nut for renewal or for any other purpose. It will be seen that the nut is freely turnable for tightening, but when the same attempts to turn in a reverse direction the teeth 7 immediately engage the threads 2 effectively preventing such movement.

The present invention relates to nut and bolt locks and has particular reference to new and useful improvements in spring pawl locked nuts.

The primary object of my invention is to provide in a novel and cheaply constructed locking device an effective retainer for nuts whereby accidental displacement or reverse rotation of the nut is prevented.

Another object of my invention is to provide a nut lock of the class described which may be cheaply manufactured and will permit rotation of a nut onto a bolt but prevents reverse rotation of the nut.

Other objects and advantages to be derived from the use of my improved nut lock will appear from the following detail description and the claims, taken with an inspection of the accompanying drawing, in which:

Figure 1:
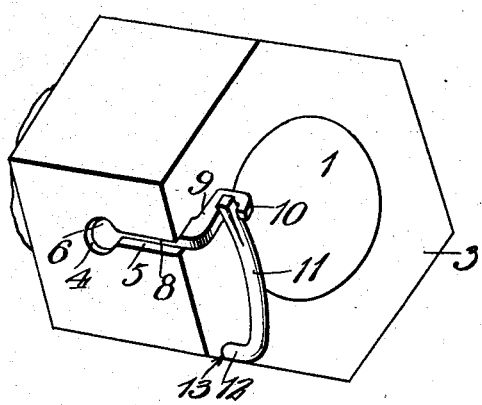
Figure 1 is a perspective view of a nut lock embodying the improvements of my invention.
Figure 2:
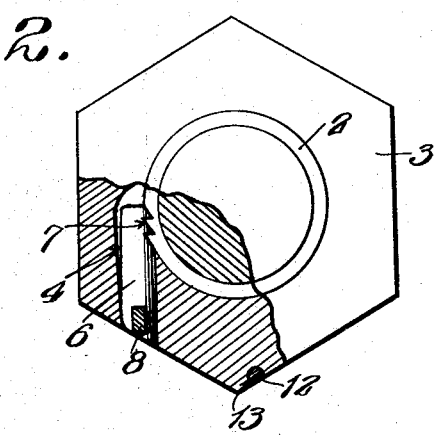
Fig. 2 is an end elevational view of the same, a portion thereof being broken away and in section.
Figure 3:
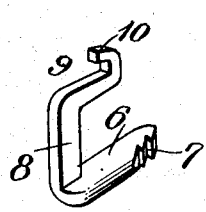
Fig. 3 is an enlarged detached perspective view of the locking elements.

Referring more particularly to the drawing, wherein similar characters of reference designate like and corresponding parts throughout the various views, 1 designates a bolt having the usual threads 2.

Attention is directed to the fact that the recess 4 is of such length as to permit free movement of the pawl member therein to effectively lock the nut against turning. If desired, the nut may first be applied to the bolt and then the pawl member inserted, or the nut may be applied without removing the pawl.

From the above description taken in connection with the accompanying drawing, it is thought that a clear and comprehensive understanding of the construction, operation and advantages of my invention may be had, and while I have shown and described the device as embodying a specific structure, I desire that it be understood that such changes may be made in said structure as do not depart from the spirit and scope of the invention as claimed.

Having thus fully described my invention, what I claim as new and desire to secure by Letters Patent, is:—

The combination with a bolt and a nut thereon, said nut having a tangential recess communicating with the bore of the nut, a nut having formed in its outer face a slot communicating at one end with said recess and at the other with one end of the nut, a pawl slidably mounted in said recess having teeth on its inner end for engagement with the bolt, a laterally projecting shank on the end of said pawl positioned in said slot and projecting through the outer end of the same, an arm on the free end of said shank extending inwardly toward the bolt, a hook member formed on said arm, and a spring carried by said end of the nut and engageable with said hook to retain the pawl within the recess.

In testimony whereof, I affix my signature hereto.

MOSE LAVEQUE.

Copies of this patent may be obtained for five cents each, by addressing the "Commissioner of Patents, Washington, D. C."